W. H. TOWERS.
Broom.

No. 29,926. Patented Sept. 4, 1860.

WITNESSES:
E. Maher
James G. Cooper

INVENTOR.
Wm. H. Towers

UNITED STATES PATENT OFFICE.

WILLIAM H. TOWERS, OF NEW YORK, N. Y.

BROOM.

Specification of Letters Patent No. 29,926, dated September 4, 1860.

*To all whom it may concern:*

Be it known that I, WILLIAM H. TOWERS, of the city, county, and State of New York, have invented a new and useful Improvement in Brooms; and I do hereby declare that the following is a full, clear, and exact description of the same, reference being had to the accompanying drawings, making part of this specification.

Figure 1:
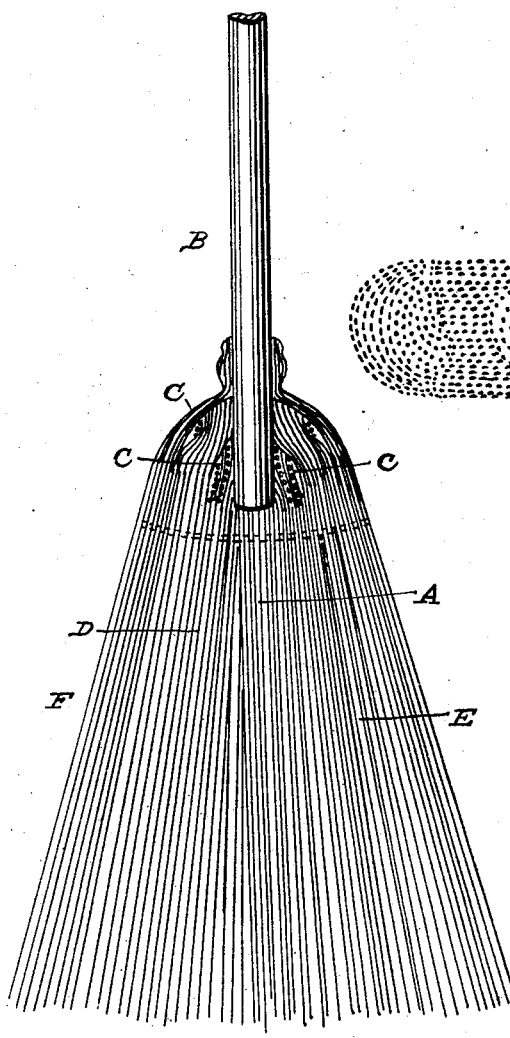
Figure 2:
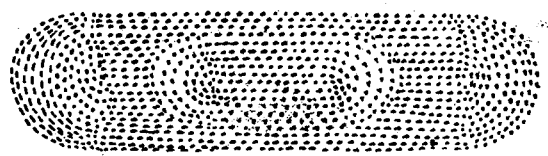

Figure 1, is a vertical section of a sweeping broom, showing the manner of combining the broom-corn and cane or reeds, and attaching the same to the handle. Fig. 2, is a view of the under part of the same.

Similar letters in the figures refer to corresponding parts.

The nature of this invention consists in forming the broom of a combination of broom-corn and strips of cane or reeds, so attached to the handle and intermingled and combined together, as to cause the latter, through its superior stiffness and elasticity, to give an increased stiffness and elasticity to the combined mass of materials forming the broom, and thereby render the same more durable and effective in sweeping, and less liable to bend at the lower part from the proper upright and divergent position.

To enable others skilled in the art to make and use my invention I will proceed to describe its construction and operation.

First spread a bunch of strips of cane or reeds A, around the lower end of the handle B, and secure them thereto by tightly winding a wire C, around the upper ends of the same, and overlaying, or more properly speaking, surrounding these strips with a course or layer of broom-corn D, secured over the said strips, by continuing the winding of the same wire C, around its upper end. Over, or outside this layer or course of broom-corn D, and on two of the sides immediately opposite each other, is bunched bodies of broom-corn and strips of cane or reeds E intermingled, slight portions or layers of the combined mass being extended along the other two remaining sides, which bodies are secured in place around the handle by winding the beforementioned wire C, around the upper ends, above the ends of the strips of cane or reeds and broom-corn. Around or outside these bunched bodies and side courses E, is equally laid a course of broom-corn F, secured at its upper end to the handle B, immediately above the upper ends of the layer or course of broom corn and strips of cane or reeds E, intermingled, by the wire being tightly wound and fastened around it. After this the broom is flattened, so as to bring the bunches of broom-corn and strips of cane or reeds, before mentioned, in bodies at opposite sides, which are thus made to form the edges of the broom, and the upper portion of the whole mass of materials is secured together in this flattened state by the usual cord intertwined and fastened through it.

In sweeping with this improved broom, it will be found that instead of the lower portion only yielding on an abrupt or short curve or bend, as is the case where the broom is formed exclusively of broom-corn, through the increased flexibility at this portion over the upper and stouter portion, the stiff and elastic intermingled strips of cane or reeds will yield equally from end to end in the form of a segment of a circle, and will sustain and retain the broom-corn intermingled with and surrounding them, in the same state, and when raised from the floor or surface being swept, will cause the whole mass to come back to the original position, thereby serving to give such a degree of stiffness and elasticity to the broom as will keep its lower portion in the proper divergent and upright position, and prevent the lower portion bending under, as before stated.

In order to more clearly define the relative positions of the broom-corn and strips of cane or reeds in the drawings, the former is represented in red lines and dots, and the latter in black lines, and by reference to these drawings it will be observed that the outer layer or course of broom-corn surrounds the entire broom, and is sufficiently thick to entirely hide from view the strips of cane or reeds.

What I claim and desire to secure by Letters Patent is—

The broom, constructed of broom corn and strips of cane or reeds substantially as described as a new article of manufacture.

WM. H. TOWERS.

Witnesses:
E. MAHER,
JAMES G. COOPER.